3,212,926
HIGH STRENGTH FIBERS
Charles R. Morelock, Ballston Spa, N.Y., assignor to General Electric Company, a corporation of New York
No Drawing. Filed May 31, 1962, Ser. No. 198,758
2 Claims. (Cl. 117—126)

This invention relates to silica fibers and more particularly to fused silica fibers having greatly increased tensile strengths.

Silica fibers of small diameters, for example up to 50 microns, have been used to manufacture such articles as silica mats, yarn and the like. These articles have found widespread use as insulating envelopes, separators, etc., where resistance to high temperature is necessary. There are many situations where use of the fibers requires that the fibers and the articles made from the fibers be electrically non-conductive and possess also the ability to withstand comparatively severe mechanical handling. For example, since many of the articles are produced by weaving or twisting in the same manner as other natural and synthetic fibers, they must be able to withstand the mechanical treatment. Prior to this invention, silica fibers have been generally not mechanically strong and have thus resulted in a high discard rate. The lack of mechanical strength in fibers produced by conventional processes results from defects appearing on their surfaces following a firing operation carried out to remove lubricating compounds used to assist twisting and weaving operations. The weak mechanical strength of the fibers is felt to occur by reason of chemical reactions taking place at the fiber surfaces during the firing removing the lubrication compounds.

It is a principal object of this invention to provide fused silica fibers having greatly improved mechanical strength.

Another object of this invention is to provide fused silica fibers of up to 50 microns in diameter which have thin thermally deposited boron nitride coatings on the exposed surfaces thereof.

Other objects of this invention will be in part obvious and in part explained by reference to the accompanying specification.

Generally, the article of this invention comprises a fused silica fiber of up to 50 microns in diameter and a pyrolytically or thermally deposited thin coating of boron nitride surrounding the exposed surface of the fiber. The boron nitride coating is extremely thin, for example not generally in excess of 1000 A., and is substantially transparent.

The coated fused silica fibers of this invention can be produced by suitably positioning or enclosing the silica fibers within a reaction chamber and raising the temperature within the chamber to a temperature of from about 600° C. to 1100° C. The pressure within the chamber should be maintained at a pressure of 1 to 2 millimeters of mercury or lower. The pressure is one that is required to be maintained just low enough to prevent a snow-like precipitation of boron nitride from forming when the gaseous reactants, viz. boron trichloride and ammonia, are introduced into the reaction vessel. Generally, when coating fused silica fibers, the reaction temperature should be maintained within the temperature range of from 800° C. to 1000° C. if coatings of uniform thickness and integrity are to be obtained.

To provide the boron nitride coating, and after the reaction chamber has been heated with the silica fibers in it, boron trichloride and ammonia are introduced into the chamber through separate inlet openings. This feature is essential to prevent the formation of solids which would preclude the formation of a coating on the silica fibers. The boron trichloride and ammonia are present in amounts such that there is an amount of ammonia slightly in excess of that required to effect a stoichiometric reaction with the boron trichloride.

Other sources of boron nitride can be used as efficaciously as the boron trichloride-ammonia combination such as for example boramines or by trichlorborazol. These compounds will thermally decompose to deliver the boron nitride coating on the exposed surfaces of the silica fibers. The reaction time required to coat the silica fibers is relatively small, times on the order of from a few seconds to five minutes generally being sufficient. Obviously, coatings of increased thickness can be formed but generally there is no particular advantage to be gained from increasing the thickness beyond about 1000 A., this thickness being sufficient to protect the surfaces of the fiber from corrosion and thereby greatly increasing the tensile strength of the fiber.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. As an article of manufacture, a high strength fused silica fiber having a maximum diameter of not more than about 50 microns, and a thin coating of thermally deposited boron nitride covering the exposed surface thereof.

2. An article as defined in claim 1 wherein said thickness of said boron nitride coating does not exceed about 1000 A.

References Cited by the Examiner
UNITED STATES PATENTS

| | | |
|---|---|---|
| 455,187 | 6/91 | Erlwein. |
| 2,491,761 | 12/49 | Parker et al. _____ 161—72 |
| 2,748,030 | 5/56 | Silversher et al. |
| 2,938,816 | 5/60 | Gunther. |

OTHER REFERENCES

Finlay et al.: "Boron Nitride—An Unusual Refractory," Ceramic Bulletin, pp. 141–3, vol. 31, No. 4, 1952.

RICHARD D. NEVIUS, *Primary Examiner.*